US010742655B2

(12) United States Patent
Taylor et al.

(10) Patent No.: US 10,742,655 B2
(45) Date of Patent: Aug. 11, 2020

(54) RESOURCE ACCESS CONTROL USING A VALIDATION TOKEN

(71) Applicant: ARM IP LIMITED, Cambridge (GB)

(72) Inventors: Robert George Taylor, Cambridge (GB); Milosch Meriac, Cambridge (GB); Andrew John Pritchard, Cambridge (GB); Hannes Tschofenig, Tirol (AT); Christopher Mark Paola, Cambridge (GB)

(73) Assignee: ARM IP Limited, Cambridge (GB)

( * ) Notice: Subject to any disclaimer, the term of this patent is extended or adjusted under 35 U.S.C. 154(b) by 89 days.

(21) Appl. No.: 15/317,805

(22) PCT Filed: May 29, 2015

(86) PCT No.: PCT/GB2015/051565
§ 371 (c)(1),
(2) Date: Dec. 9, 2016

(87) PCT Pub. No.: WO2015/189565
PCT Pub. Date: Dec. 17, 2015

(65) Prior Publication Data
US 2017/0126685 A1    May 4, 2017

(30) Foreign Application Priority Data
Jun. 11, 2014   (GB) .................................. 1410362.6

(51) Int. Cl.
*H04L 29/06* (2006.01)
*G06F 21/62* (2013.01)
*G06F 21/10* (2013.01)

(52) U.S. Cl.
CPC .............. *H04L 63/10* (2013.01); *G06F 21/10* (2013.01); *G06F 21/6209* (2013.01); *H04L 63/083* (2013.01)

(58) Field of Classification Search
CPC .............................. H04L 63/10; H04L 63/083
(Continued)

(56) References Cited

U.S. PATENT DOCUMENTS 6,718,328 B1    4/2004  Norris
10,021,179 B1 *  7/2018  Velummylum ..... H04L 67/2857
(Continued)

FOREIGN PATENT DOCUMENTS

CN    101414907    4/2009
CN    101663670    3/2010
(Continued)

OTHER PUBLICATIONS

Kbar, Ghassan, "Wireless network token-based fast authentication," 2010 17th International Conference on Telecommunications Year: 2010 | Conference Paper.*
(Continued)

*Primary Examiner* — Roderick Tolentino
(74) *Attorney, Agent, or Firm* — Nixon & Vanderhye P.C.

(57) ABSTRACT

Access to a resource controlled by a resource server (6, 8) is provided using a validity token issued by a validation server (4). When a resource request from a user (12) is received at the resource server (6, 8), then the resource server (6, 8) determines if the resource request satisfies a policy. If the resource request satisfies the policy, then access to the resource may be permitted without confirming the validity of the validation token with the validation server (4). Conversely, if the resource request does not satisfy the policy, then validation of the validation token with the validation server (4) is performed before the access requested is permitted.

10 Claims, 5 Drawing Sheets

(58) Field of Classification Search
USPC .......................................................... 726/1–9
See application file for complete search history.

(56) References Cited

U.S. PATENT DOCUMENTS

| | | | |
|---|---|---|---|
| 2008/0002696 A1* | 1/2008 | Claessens | H04L 63/102 370/392 |
| 2008/0263651 A1 | 10/2008 | Chander et al. | |
| 2008/0263652 A1* | 10/2008 | McMurtry | G06F 21/335 726/9 |
| 2009/0222900 A1 | 9/2009 | Benaloh et al. | |
| 2010/0325441 A1* | 12/2010 | Laurie | G06F 21/31 713/185 |
| 2011/0162057 A1* | 6/2011 | Gottumukkala | G06F 21/6218 726/8 |
| 2012/0174198 A1 | 7/2012 | Gould et al. | |
| 2013/0160135 A1 | 6/2013 | Seleznev et al. | |
| 2013/0326166 A1* | 12/2013 | Desai | G06F 9/5016 711/158 |
| 2013/0340093 A1 | 12/2013 | Reinertsen | |
| 2014/0025585 A1 | 1/2014 | Calman | |
| 2014/0026193 A1* | 1/2014 | Saxman | G06F 21/33 726/4 |
| 2014/0090037 A1 | 3/2014 | Singh | |
| 2014/0123214 A1* | 5/2014 | Black | H04W 12/06 726/1 |
| 2015/0350186 A1* | 12/2015 | Chan | H04L 63/083 726/9 |
| 2016/0191528 A1* | 6/2016 | McMurtry | G06F 21/335 726/4 |

FOREIGN PATENT DOCUMENTS

| | | |
|---|---|---|
| CN | 102404392 | 4/2012 |
| GB | 2502739 | 12/2013 |
| WO | WO 01/63567 | 8/2001 |
| WO | WO 02/39281 | 5/2002 |
| WO | WO 2005/003907 | 1/2005 |

OTHER PUBLICATIONS

Iturralde et al., "Resource allocation for real time services using cooperative game theory and a virtual token mechanism in LTE networks," 2012 IEEE Consumer Communications and Networking Conference (CCNC) Year: 2012 | Conference Paper.*
International Search Report for PCT/GB2015/051565, dated Jul. 14, 2015, 3 pages.
Search Report for GB1410362.6, dated Dec. 29, 2014, 4 pages.
Search Report for GB1410362.6, dated May 5, 2015, 3 pages.
International Preliminary Report on Patentability dated Dec. 22, 2016 in PCT/GB2015/051565, 8 pages.
First Office Action dated Oct. 22, 2018 in CN Application No. 201580031075.9 and English translation, 33 pages.
Second Office Action for CN Application No. 201580031075.9 dated May 14, 2019 and English translation, 32 pages.

* cited by examiner

RESOURCE ACCESS CONTROL USING A VALIDATION TOKEN

This application is the U.S. national phase of International Application No. PCT/GB2015/051565 filed 29 May 2015, which designated the U.S. and claims priority to GB 1410362.6 filed 11 Jun. 2014, the entire contents of each of which are hereby incorporated by reference.

The present technique relates to the field of data processing systems. More particularly, the technique relates to control of access by a user to a resource controlled by a resource server using a validation token issued by a validation server.

It is known to provide data processing systems in which a resource, such as data, is held by a resource server and access to that data is controlled via validation tokens issued by a validation server. A user will contact and authenticate themselves with the validation server and if this authentication is successful then the user will be issued with a validation token. The validation token can then be sent by the user to a resource server together with a request to access a resource managed by that resource server. The resource server will then contact the validation server to check that the validation token is authentic, and, if the validation token is authentic, then the resource server will provide access to the resource as requested by the user.

Viewed from one aspect the present technique provides a method of controlling access by a user to a resource controlled by a resource server, said method comprising the steps of:

receiving at a validation server a validation request from said user;

if said validation request meets one or more validation criteria, then issuing to said user a validation token;

receiving at said resource server a resource request and said validation token from said user seeking to access said resource;

determining at said resource server if said resource request satisfies a policy and
  (i) if said resource request satisfies said policy, then permitting said user to access said resource without confirming validity of said validation token with said validation server; and
  (ii) if said resource request does not satisfy said policy, then confirming validity of said validation token with said validation server before permitting said user to access said resource.

The present technique serves to reduce the amount of communications traffic concentrating on the validation server as if the policy is satisfied, then the validation token may be accepted and the access permitted without the step of confirming the validity of the token with the validation server.

The validation token may itself be subject to a validity check performed by the resource server without reference to the validation server. As an example, the validation token may be digitally signed by the validation server and the resource server may check that the validation token it is being presented with is appropriately digitally signed. Such a check may be performed by the resource server itself without needing to communicate/confirm with the validation server.

The policy which the received resource request may or may not satisfy can be established in a number of different ways. In some embodiments the policy is specified by policy data within the validation token itself. In other embodiments, the policy data may be held by the resource server. Combinations of these options are also be possible.

In some embodiments the resource server provides access to a plurality of resources. These plurality of resources may have different levels of security/sensitivity associated with them. Accordingly, in some embodiments the policy may specify a first set of the plurality of resources to which access can be provided without confirming the validity of the validation token and a second set of the plurality of resources to which access can be provided after confirming validity of the validation token with the validation server. Thus, low sensitivity/security resources may form the first set and high sensitivity/security resources may form part of the second set. As examples, the first set of resources may comprise resources that do not change data held by the resource server and the second set of resources may comprise resources that do change data held by the resource server. Thus, read access can be provided more readily (i.e. without need to confirm the validity of the validation token with the validation server) than write access. In some embodiments the first set of resources may be exclusively (only) resources that do not change data held by the resource server and the second set of resources may exclusively (only) comprise resources that do change data held by the resource server.

It will be appreciated that the policy which controls whether or not the validity of the validation token is confirmed can have a wide variety of different forms. In some embodiments, the validation token includes a timestamp indicating when that validation token was issued by the validation server. In this context, a policy may control the resource server to confirm validity of the validation token with the validation server before permitting access to the resource if the timestamp indicates that the duration since the validity token was issued by the validation server is greater than a threshold duration. Thus, relatively freshly issued validation tokens may be accepted without requiring confirmation with the validation server, whereas older validation tokens will require their validity to be checked before the access they are seeking to validate is permitted.

In some embodiments the validation token may include usage account data indicating a threshold number of times that the validation token can be used to validate access to the resource without confirmation from the validation server. The policy then controls the resource server to confirm validity of the validation token with the validation server before permitting the user to access the resource if the validation token alone has already been used to validate access to the resource the threshold number of times. Thus, a validation token may be permitted to self-validate a resource request up to a threshold number of times before the validation token will require checking with the validation server.

It will be appreciated that the complexity of the policy applied by the server can vary and combinations of the above factors (i.e. timestamp, usage, count etc.) as well as other factors may all form part of the policy applied and used to control whether or not a validation token is required to have its validity confirmed with the validation server before the associated resource request is permitted.

In some embodiments, the validation server sends token blacklist data to the resource server specifying validation tokens that have been issued to users and that should no longer be used to validate accesses. The resource server checks the validation token accompanying a resource request against the token blacklist data to determine whether or not the validation token is permitted to validate the resource request. Thus, the validation server can effectively override a policy applied by a resource server that would allow a validation token to validate a resource request without confirming validity with the validation token by blacklisting that validation token. Such an override mechanism may be used, for example, in the case of tokens that had been issued to a user where it is known that the user should no longer be permitted access (e.g. an ex employee) and yet the normal policies would permit the validation tokens already issued to that user to authorize resource requests without requiring a check back to the validation server. The token blacklist data provides a security backstop to the relaxation of the requirement to check the validity of all validation tokens with the validation server every time they are presented at a resource server.

It will be appreciated that the policy may be set by algorithms and parameters entirely held within the resource server itself. However, in some embodiments, the validation token includes a data structure (e.g. XML) readable by the resource server and specifying one or more parameters used by the resource server in determining whether or not the policy is satisfied. Such parameters embedded within the validation token, may include timestamp data, usage count data, authorization level data etc.

While it is possible that the user, the resource server and the validation server could be co-located, the present techniques may be applied when the validation server and the resource server are located in different locations and linked via a telecommunications link. The use of the policy at the resource server to determine whether or not a check needs to be made as to the validity of a received validation token with the validation server may serve to reduce the telecommunications traffic requirement on the telecommunications link and accordingly ease the communication overhead.

While the above has discussed the system as a whole, it will be appreciated that the form and operation of the various components of the system also represent additional techniques in their own right. It will further be realized that different portions of the overall system may be located in different parts of the world, e.g. the user making the resource access request, the validation server and the resource server may all be in different countries and connected via telecommunications links.

Viewed from another aspect the present technique provides a method of controlling access by a user to a resource controlled by a resource server using a validation token issued by a validation server, said method comprising the steps of:

receiving at said resource server a resource request and said validation token from said user seeking to access said resource; and determining at said resource server if said resource request satisfies a policy and
 (i) if said resource request satisfies said policy, then permitting said user to access said resource without confirming validity of said validation token with said validation token; and
 (ii) if said resource request does not satisfy said policy, then confirming validity of said validation token with said validation server before permitting said user to access said resource.

Viewed from another aspect the present technique provides a method of controlling access by a user to a resource controlled by a resource server, said resource server determining whether or not to confirm validity with a validation server of a validation token accompanying a resource request in dependency upon a policy, said method comprising the steps of:

receiving at a validation server a validation request from said user; and if said validation request meets one or more validation criteria, then issuing to said user a validation token, wherein said validation token issued by said validation server includes a data structure readable by said resource server and specifying one or more parameters used by said resource server in determining whether or not said policy is satisfied.

Viewed from another aspect the present technique provides a data processing system having a resource server for providing a resource to a user and a validation server, wherein said validation server is configured to receive a validation request from said user and, if said validation request meets one or more validation criteria, then to issue to said user a validation token; and said resource server is configured to receive a resource request and said validation token from said user seeking to access said resource, to determine if said resource request satisfies a policy, and
 (i) if said resource request satisfies said policy, then to permit said user to access said resource without confirming validity of said validation token with said validation server; and
 (ii) if said resource request does not satisfy said policy, then to confirm validity of said validation token with said validation server before permitting said user to access said resource.

Viewed from another aspect the present technique provides a resource server for providing access by a user to a resource using a validation token issued by a validation server, said resource server comprising:

a receiver configured to receive a resource request and said validation token from said user seeking to access said resource; and a validation controller configured to determine if said resource request satisfies a policy and
 (i) if said resource request satisfies said policy, then to permit said user to access said resource without confirming validity of said validation token with said validation server; and
 (ii) if said resource request does not satisfy said policy, then to confirm validity of said validation token with said validation server before permitting said user to access said resource.

Viewed from another aspect the present technique provides a validation server for controlling access by a user to a resource controlled by a resource server, said resource server determining whether or not to confirm validity with said validation server of a validation token accompanying a resource request in dependency upon a policy, said validation server comprising:

a receiver configured to receive a validation request from said user; and a token issuing unit configured to issue said user a validation token if said validation request meets one or more validation criteria, wherein said validation token issued by said validation server includes a data structure readable by said resource server and specifying one or more parameters used by said resource server in determining whether or not said policy is satisfied.

Viewed from another aspect the present technique provides a data processing system having resource server means for providing a resource to a user and validation server means for providing a validation token, wherein said validation server means is adapted to receive a validation request from said user and, if said validation request meets one or more validation criteria, then to issue to said user said validation token; and said resource server means is adapted to receive a resource request and said validation token from said user seeking to access said resource, to determine if said resource request satisfies a policy, and
  (i) if said resource request satisfies said policy, then to permit said user to access said resource without confirming validity of said validation token with said validation server means; and
  (ii) if said resource request does not satisfy said policy, then to confirm validity of said validation token with said validation server means before permitting said user to access said resource.

Viewed from another aspect the present technique provides a resource server for providing access by a user to a resource using a validation token issued by a validation server, said resource server comprising:

receiving means for receiving a resource request and said validation token from said user seeking to access said resource; and validation means for determining if said resource request satisfies a policy and
  (i) if said resource request satisfies said policy, then permitting said user to access said resource without confirming validity of said validation token with said validation token; and
  (ii) if said resource request does not satisfy said policy, then confirming validity of said validation token with said validation server before permitting said user to access said resource.

Viewed from another aspect the present technique provides a validation server for controlling access by a user to a resource controlled by a resource server, said resource server determining whether or not to confirm validity with said validation server of a validation token accompanying a resource request in dependency upon a policy, said validation server comprising:

receiving means for receiving a validation request from said user; and token issuing means for issuing said user a validation token if said validation request meets one or more validation criteria, wherein said validation token issued by said validation server includes a data structure readable by said resource server and specifying one or more parameters used by said resource server in determining whether or not said policy is satisfied.

Embodiments will now be described, by way of example only, with reference to the accompanying drawings in which:

FIG. 1 schematically illustrates a data processing system including a validation server, multiple resource servers and a user device operated by a user and all linked via a telecommunications link;

FIG. 2 schematically illustrates communication and processing flow in making validation token requests and resource requests within the system of FIG. 1;

Figure 1:
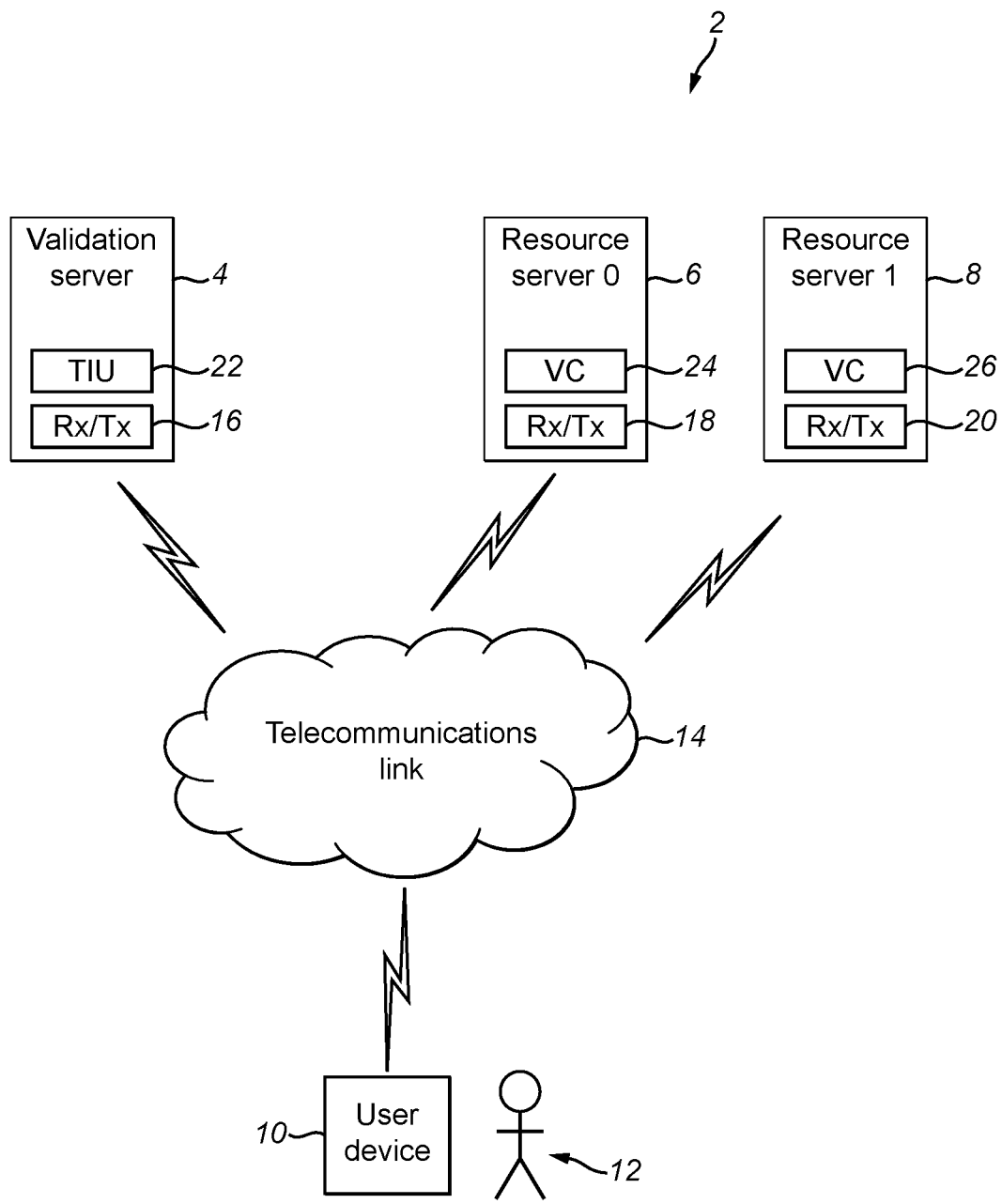

FIG. 1 schematically illustrates a data processing system 2 including a validation server 4, multiple resource servers 6, 8 and a user device 10 (such as a wearable computing device, a mobile telephone, a laptop, computer etc) operated for example, by a user 12 all linked via a telecommunications link 14, such as the internet. The validation server 4 and the resource servers 6, 8 each include respective receivers 16, 18, 20 for receiving communications from the telecommunications link 14. The receivers 16, 18, 20 may also serve to transmit responses back to other elements within the data processing system 2 via the telecommunications link 14 (or separate transmitters may be provided).

The validation server 4 includes a token issuing unit 22 which is configured to issue a validation token to a user if a validation request received from a user 12 meets predetermined validation requirements. As an example, the user 12 may provide a username and password as part of the validation request sent to the validation server 4 and the token issuing unit 22 may compare this username and password with corresponding data held within the validation server. If the received username and password match the data already held within the validation server 4, then a validation token (e.g. a signed and encrypted block of XML data) from the validation server 4 may be issued back to the user 12 (and stored on their user device 10) using the token issuing unit 22.

This validation token issued by the token issuing unit 22 may include a data structure readable by the resource servers 6, 8, specifying one or more parameters used by the resource servers in determining whether or not a policy which those resource servers will apply is or is not satisfied. The parameters represented within the data structure of the validation token may include, for example, parameters such as a timestamp indicating the time at which the validation token was issued, a use count indicating how many times the validation token may be used before its validity needs to be checked, an authorization level associated with the username and password which has been checked etc. The data structure embedded within the validation token may for example be in the form of an XML data structure. This data structure may be encrypted and then the validation token digitally signed in a manner so as to protect it from unauthorized alteration.

The resource servers 6, 8 each include a respective validation controller 24, 26, which operate upon resource requests received at their respective resource servers 6, 8. These validation controllers 24, 26 serve to respond to a resource request received from a user device 10 via the telecommunication link 14 by evaluating/applying a policy to determine whether or not a validation token accompanying that resource request should or should not have its validity confirmed with the validation server 4 before the access request is permitted. The policy applied by the validation controller 24, 26 can take a wide variety of different forms. The policy may be based upon data and parameters stored within the resource server 6, 8 itself, may be based upon parameters read from the validation token received, from data retriever from elsewhere or a combination of the above.

Examples of the policies which may be applied include comparing a timestamp embedded within the validation token with a current time to determine whether or not the duration since that validation token was issued is greater than a threshold duration. If the duration since issue is greater than the threshold duration then the validation token is subject to its validity being confirmed by the validation server 4 prior to the resource access request being permitted. Conversely, if the duration since the validation token was issued is less than the threshold duration, then the validation token may be taken to authorize the access request without requiring its validity to be confirmed by the validation server 4.

Another example of the policy applied by the validation controller 24, 26, either in combination with the timestamp or independently of the timestamp is one based upon a usage count. The validation token may include usage count data indicating a threshold number of times that the validation token can be used to validate access at a particular resource server 6, 8. The validation controller 24, 26 can compare this usage count data with a count data for that validation token which is maintained within the resource server 6, 8 to determine whether or not the usage count has yet exceeded a threshold number of times. If the usage count has not yet exceeded the threshold number of times, then the validation token may for example, be used to validate the resource access request without a requirement for its validity to be confirmed by the validation server 4. Conversely, if the usage count indicates that the validation token has already been used to access the resource the threshold number of times, then the validity of the validation token must be confirmed by the validation server 4 before the resource access request is permitted at the resource server 6, 8. It will be appreciated that the count of the uses of a validation token may be held within the resource server 6, 8 or may be embedded within the validation token itself and updated by the resource server 6, 8 each time it is used.

A further example of a policy which may be applied is one in which the resource server provides access to a plurality of resources and divides these into a first set of the plurality of resources to which access can be provided without confirming validity of the validation token with the validation server and a second set of the plurality of resources to which access can be provided after confirming the validity of the validation token with the validation server. Thus, the second set of resources are the more securely protected set of resources. In some examples, the first set may comprise resources that do not change data held within the resource server 6, 8 and the second set may comprise resources that do change data held by the resource server 6, 8. Thus, write access is more security controlled than read access. In some further examples, the first set may comprise only (i.e. exclusively) resources that do not change data held within the resource server 6, 8 and the second set may comprise only (i.e. exclusively) resources that do change data held by the resource server 6, 8.

A further feature of the data processing system 2 illustrated in FIG. 1 is that the validation server 4 may send token blacklist data via the telecommunications link 14 to the resource server 6, 8. This token blacklist data specifies validation tokens that have been issued by the validation server 4 to user devices 10/users 12 that should no longer be used to validate accesses. Thus, even if the policies normally applied by the resource servers 6 and the validation tokens accompanying resource access requests would permit access, this access may be overridden by the token blacklist data that specifies that particular validation tokens should no longer be honored. As an example, if a validation token is issued to a particular user and then that user is known to lose their authorized status (e.g. leaves the organization involved), then it would be appropriate to inform the resource servers 6, 8, via the token blacklist data that validation tokens issued to that user 12 should no longer be considered valid. Thus, even if a received validation token and the policy would indicate that the validation token can be used to authorize a resource access request without requiring the validation token to have its validity confirmed by the validation server, this permission may be overridden by the token blacklist data. The number of validation tokens likely to require their validity to be overridden in this way is relatively small and accordingly the token blacklist data provides an efficient way of managing security without requiring every use of a validation token to have the validity of that validation confirmed by the validation server 4, particularly given the communication and processing overheads associated with such confirmations.

The validation tokens issued by the token issuing unit 22 may be digitally signed by the validation server. The validation controller 24, 26 within the resource server 6, 8 may check that the validation token is correctly digitally signed as part of validating the resource request. Checking the digital signal in this way may be performed as an additional preliminary validity check prior to then applying the policy or policies discussed above to determine whether or not the validity of the validation token should be confirmed with the validation server 4.

Figure 2:
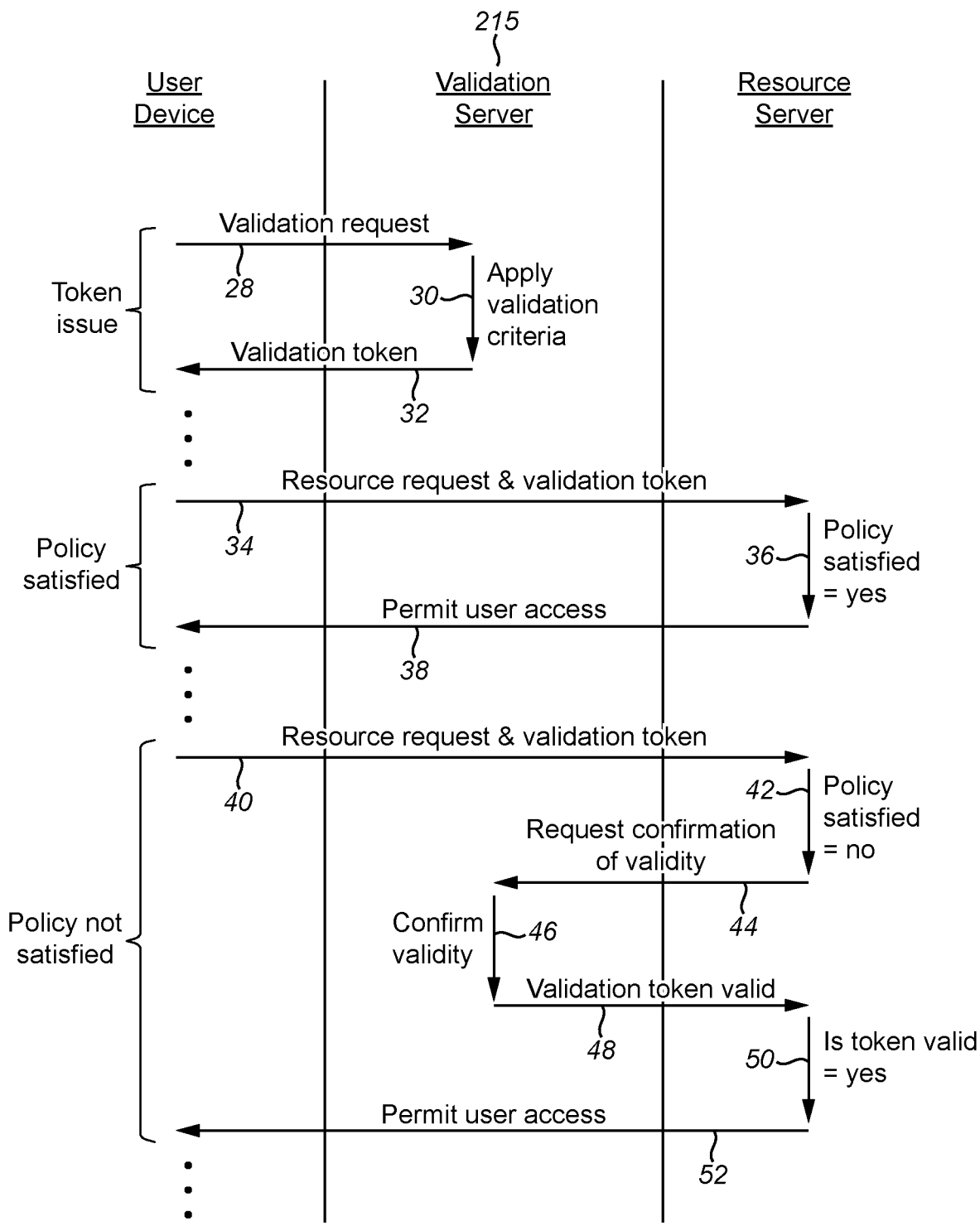

FIG. 2 schematically illustrates communication between the user device 10, the validation server 4 and the resource server 6, 8 as well as processing operations performed by these entities. The token issue processing is initiated by a validation request 28 sent from the user device 10 to the validation server 4. This validation request may include security details such as a username and a password of the user 12. The validation server 4 then applies validation criteria at step 30 to determine whether or not the validation request should be granted. If the validation criteria are met (e.g. a username and password match), then a validation token 32 is returned to the user device at step 32. This validation token may be digitally signed by the validation server 4 and may include policy data and parameter data such as discussed above for controlling when and if that validation token requires its validity to be confirmed by the validation server 4 when it is presented to a resource server 6, 8.

At step 34 a user device 10 sends a resource request accompanied by the validation token to a resource server 6, 8. At step 36 the resource server then applies the policy using its validation controller 24, 26 to determine whether or not that policy is satisfied. If the policy is satisfied, then the access requested at step 34 is permitted without requiring any communication with the validation server 4 and the access result is returned at step 38.

Finally in FIG. 2 there is illustrated the communication and processing which occurs when the policy applied by the resource server 6, 8 is not satisfied. At step 40 a resource request together with a validation token is sent from a user device 10 to a resource server 6, 8. At step 42 the resource server 6, 8 using its validation controller 24, 26 applies the policy specified by the data held within the resource server 6, 8, the data within the validation token received or a combination of the above, and determines that the policy is not satisfied. Step 44 then sends a request for confirmation of validity from the resource server 6, 8 to the validation server 4. At step 46 the resource server 4 confirms the validity of the validation token and sends back a message at step 48 to the resource server 6, 8 that the token is valid. Step 50 corresponds to the resource server 6, 8 examining the message sent back from the validation server 4 and determining that it indicates that the validation token is valid. This step is then followed by step 52 at which the access originally requested at step 40 is permitted, e.g. the requested data access is allowed whether this be a read, a write or some other access or use of a resource.

Figure 3:
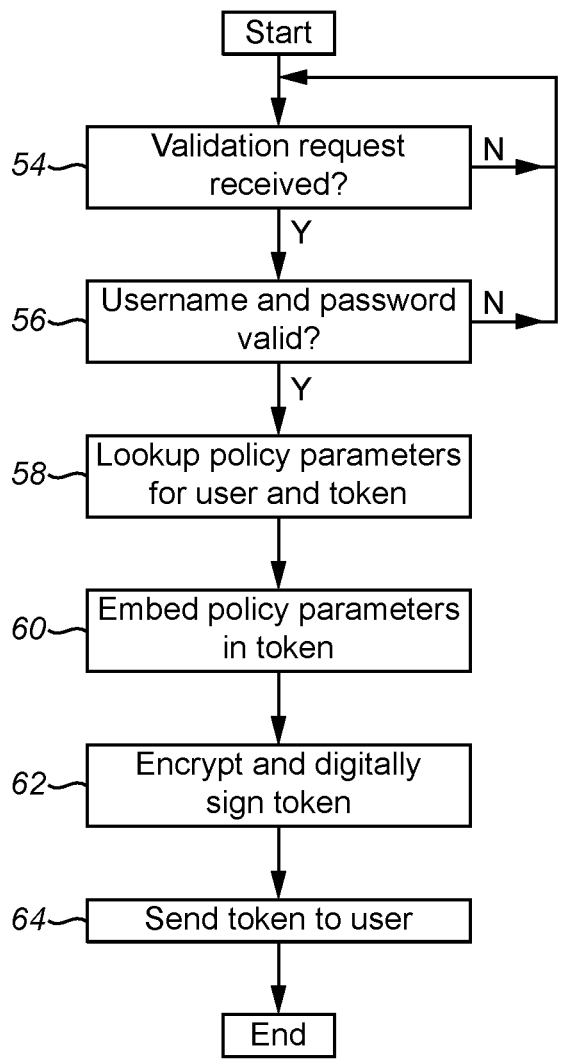
FIG. 3 is a flow diagram schematically illustrating token issue by a validation server.

FIG. 3 is a flow diagram schematically illustrating processing performed by the validation server 4 when issuing tokens. At step 54 a validation request is received from a user device 10/user 12. Step 56 then determines whether or not the username and password which accompanied that validation request is valid. If the username and password is valid, then processing proceeds to step 58 where the validation server 4 looks up policy parameters to be associated with that user and the token to be issued. The policy parameters may vary depending upon the authorization level of the user concerned and may vary depending upon the nature of the token being issued. At step 60 the policy parameters are embedded within the token to be issued, such as within an XML data structure within the token. Step 62 then encrypts the token and digitally signs the token before step 64 sends the token back to the user device 10/user 12.

Figure 4:
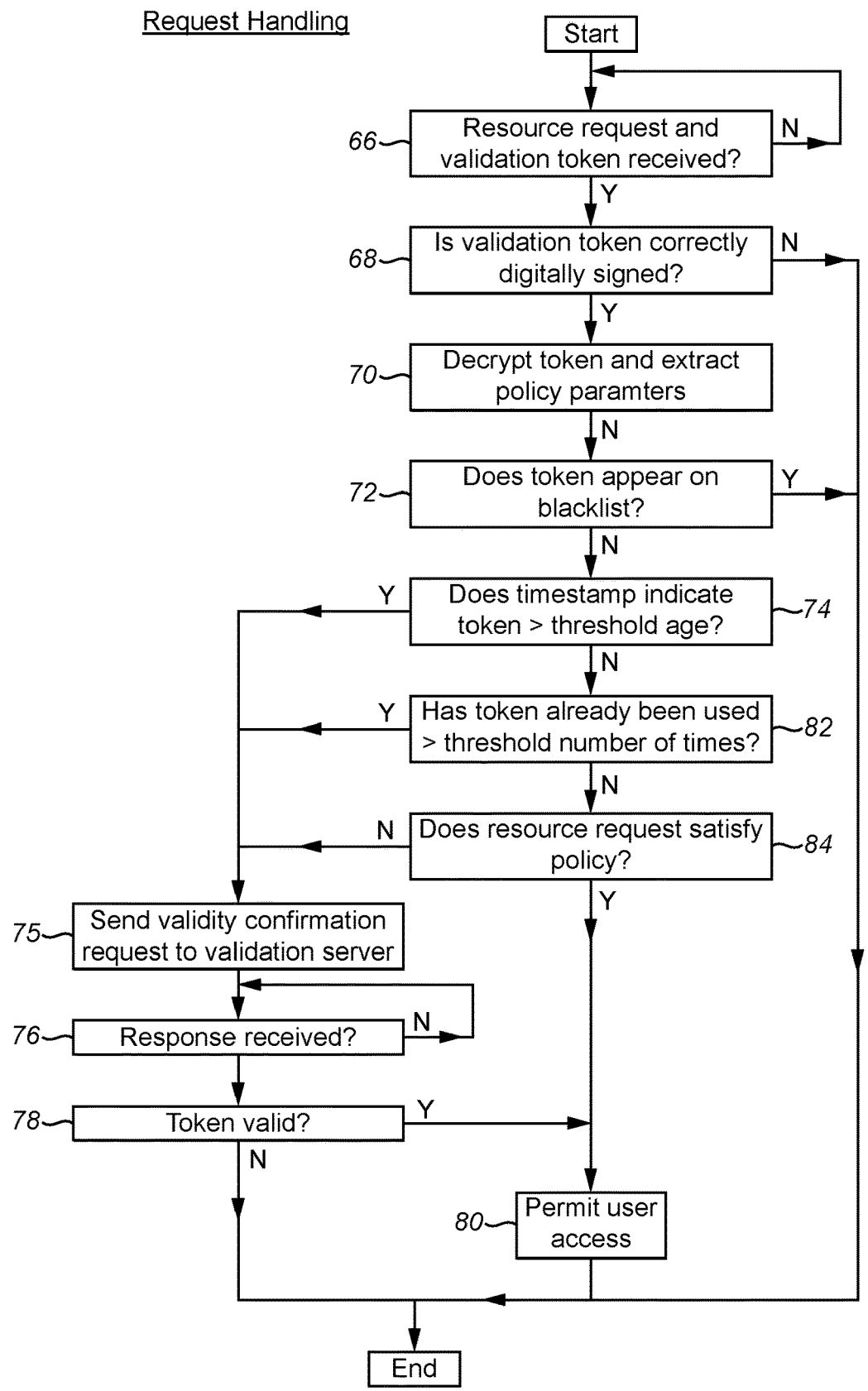
FIG. 4 is a flow diagram schematically illustrating request handling by a resource server.

FIG. 4 schematically illustrates request handling performed by the resource server 6, 8. At step 66 processing waits until a resource request and validation token are received. Step 68 determines whether or not the validation token is correctly digitally signed. If the validation token is not correctly digitally signed, then the request is rejected. If the validation token is correctly signed, then step 70 serves to decrypt the token and extract the policy parameters therefrom.

Step 72 determines whether or not the token which has been decrypted 70 is one which appears upon a blacklist as specified by the token blacklist data of tokens for which the validity has been revoked by the validation server 4. If the token does appear on the blacklist, then the resource request is rejected and processing terminates. If the token does not appear on the blacklist, then processing proceeds to apply the policy for determining whether or not a validation check with the validity server 4 should or should not be performed.

Step 74 determines whether or not timestamp data embedded within the token indicates that the age of the token is greater than a threshold age. If the timestamp data does indicate that the age is greater than a threshold age, then processing proceeds to step 75 where a validity confirmation request is sent to the validation server 4. Step 76 then waits for a response to be received from the validation server 4. When the response is received, then step 78 determines whether or not the response indicates that the token is valid. If the token is indicated as valid, then processing proceeds to step 80 where the resource request access received at step 66 is permitted. If the determination at step 78 is that the token is not valid, then the token is rejected and the processing terminates.

If the test at step 74 indicated that the threshold age of the validation token has not yet been exceeded, then processing proceeds to step 82 where a determination is made as to whether or not that validation token has already been used greater than a threshold number of times. This threshold number of times and the number of uses may be data which is embedded within the validation token itself and/or held by the resource server 6, 8. If the token has already been used greater than a threshold number of times, then processing proceeds to step 75. If the token has been used less than the threshold number of times, then processing proceeds to step 84.

Step 84 serves to determine whether or not the resource request satisfies any other aspects of the policy to be applied. This policy may, for example, specify that if the request is one within a first set of a plurality of possible requests, then it should be permitted without requiring validation of the validation token (i.e. the policy is satisfied) or conversely that the request is one falling within a second set which always requires the validation token to be validated with the validation server 4 (i.e. the policy is failed). If the policy is failed, then processing proceeds to step 75 where validation of the validation token is requested from the validation server 4. Conversely, if the policy is satisfied at step 84 then processing proceeds to step 80 where the resource request is permitted and the user is given access to the resources of the resource server 6, 8 which they requested.

Figure 5:
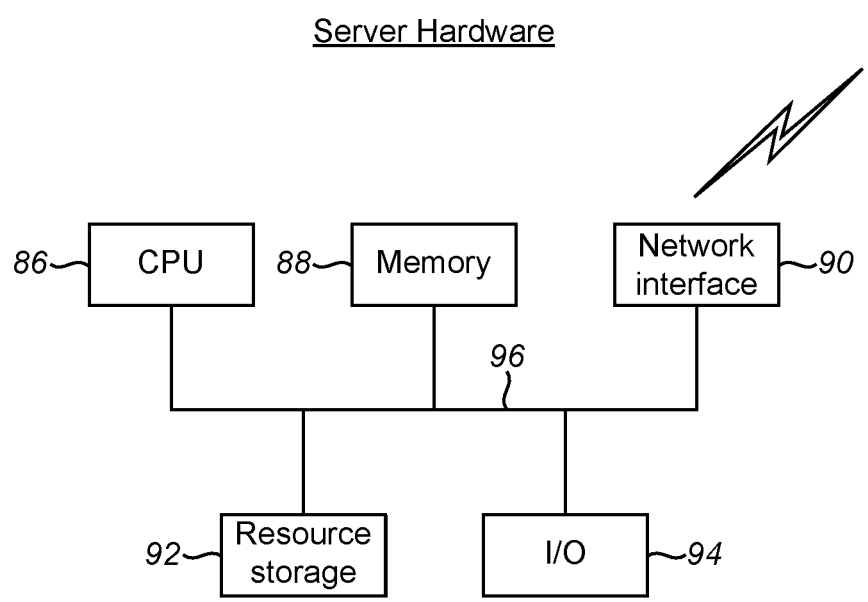
FIG. 5 is a diagram schematically illustrating server hardware which may be used to provide one or more of the validation server and resource server used with the present techniques.

FIG. 5 schematically illustrates a hardware configuration which may be used by the servers 4, 6, 8 in FIG. 1. These servers may include a central processing unit 86, a memory 88, a network interface 90, resource storage 92 and input/output devices 94 all connected via a bus 96. As will be familiar to those in this technical field, the memory 88 may include computer programs which are executed by the central processing unit 86 and control the server 4, 6, 8 to perform the operations discussed above. Software executed by the central processing unit 86 may perform, for example, one or more of the functions of the token issuing unit 22 and/or the validation controller 24, 26. The network interface 90 may serve to receive communications from the telecommunications link 14 and to transmit communications via the telecommunications link 14. The resource storage 92 may store, for example, a database of information to which a user 12 via a user device 10 may be seeking to gain access (such as, for example, read access or write access).

The invention claimed is:

1. A method of controlling access by a user device to a resource controlled by a resource server, said method comprising the steps of:
   receiving at a validation server a validation request from said user device;
   when said validation request meets one or more validation criteria, then issuing to said user device a validation token comprising an encrypted data structure specifying one or more parameters;
   receiving at said resource server a resource request and said validation token comprising said encrypted data structure from said user device seeking to access said resource;
   decrypting, at said resource server, said encrypted data structure to generate a decrypted data structure;
   determining at said resource server using said one or more parameters in said decrypted data structure when said resource request satisfies a policy which specifies that access to the resource can be provided without confirming validity of said validation token with said validation server when the duration since issue of the validation token is less than a duration threshold and that access to the resource can be provided by confirming validity of said validation token with said validation server when the duration since issue of the validation token is greater than a duration threshold:
   and
   (i) when the duration since issue of the validation token is less than the duration threshold, then permitting said user device to access said resource without confirming validity of said validation token with said validation server; and (ii) when the duration since issue of the validation token is greater than the duration threshold, then:
sending, from said resource server to said validation server, a request for confirmation of validity of said validation token;
receiving, at said resource server from said validation server, a message confirming said validity of said validation token;
permitting said user device to access said resource when said validity of said validation token is confirmed.

2. A method as claimed in claim 1, wherein upon receipt of said validation token, said resource server itself performs a validity check upon said validation token.

3. A method as claimed in claim 1, wherein said policy is specified by one of:
(i) policy data within said validation token; and
(ii) policy data held by said resource server.

4. A method as claimed in claim 1, wherein said resource server provides access to a plurality of resources and said policy specifies:
(i) a first set of said plurality of resources to which access can be provided without confirming validity of said validation token with said validation server; and
(ii) a second set of said plurality of resources to which access can be provided after confirming validity of said validation token with said validation server.

5. A method as claimed in claim 4, wherein said first set comprises resources that do not change data held by said resource server and said second set comprises resources that do change data held by said resource server.

6. A method as claimed in claim 1, wherein said validation token includes usage count data indicating threshold number of times said validation token can be used to validate access to said resource without confirmation from said validation server and said policy controls said resource server to confirm validity of said validation token with said validation server before permitting said user device to access said resource if validation token has already been used to validate access to said resource said threshold number of times.

7. A method as claimed in claim 1, wherein said validation server sends token blacklist data to said resource server specifying validation tokens that have been issued and that should no longer be used to validate accesses and said resource server checks said validation token accompanying said resource request against said blacklist data to determine whether or not said validation token is permitted to validate said resource request.

8. A method as claimed in claim 1, wherein said validation token is digitally signed by said validation server and said resource server checks that said validation token is correctly digitally signed as part of validating said resource request.

9. A method as claimed in claim 1, wherein said validation server and said resource server are located in different locations and linked via a telecommunications link.

10. A method of controlling access by a user device to a resource controlled by a resource server using a validation token issued by a validation server, said method comprising the steps of:
receiving at said resource server a resource request and said validation token from said user device seeking to access said resource, said validation token comprising an encrypted data structure specifying one or more parameters;
decrypting, at said resource server, said encrypted data structure to generate a decrypted data structure; and
determining at said resource server using said one or more parameters in said decrypted data structure when said resource request satisfies a policy which specifies that access to the resource can be provided without confirming validity of said validation token with said validation server when the duration since issue of the validation token is less than a duration threshold and that access to the resource can be provided by confirming validity of said validation token with said validation server when the duration since issue of the validation token is greater than a duration threshold; and
(i) when the duration since issue of the validation token is less than the duration threshold, then permitting said user device to access said resource without confirming validity of said validation token with said validation server; and
(ii) when the duration since issue of the validation token is greater than the duration threshold, then:
sending, from said resource server to said validation server, a request for confirmation of validity of said validation token;
receiving; at said resource server from said validation server, a message confirming said validity of said validation token;
permitting said user device to access said resource when said validity of said validation token is confirmed.

* * * * *